(12) United States Patent
Muranaka et al.

(10) Patent No.: US 6,689,820 B2
(45) Date of Patent: Feb. 10, 2004

(54) ANION EXCHANGER, PROCESS FOR PRODUCING SAME, AND ITS USE

(75) Inventors: Kazuaki Muranaka, Shinnanyo (JP); Teruhiko Tsuda, Shinnanyo (JP)

(73) Assignee: Tosoh Corporation, Yamaguchi (JP)

( * ) Notice: Subject to any disclaimer, the term of this patent is extended or adjusted under 35 U.S.C. 154(b) by 187 days.

(21) Appl. No.: 10/051,193

(22) Filed: Jan. 22, 2002

(65) Prior Publication Data

US 2002/0099104 A1 Jul. 25, 2002

(30) Foreign Application Priority Data

Jan. 24, 2001 (JP) ........................................ 2001-015581

(51) Int. Cl.$^7$ .................................................. C08J 5/20
(52) U.S. Cl. ........................... 521/30; 521/25; 525/385; 525/540; 528/407; 210/660
(58) Field of Search ............................... 521/25, 30, 32; 525/385, 540; 528/407; 210/660

(56) References Cited

U.S. PATENT DOCUMENTS

| | | |
|---|---|---|
| 3,083,118 A | 3/1963 | Bridgeford |
| 3,723,306 A | 3/1973 | Brideford |
| 3,732,306 A | 5/1973 | Gutman et al. |
| 4,026,831 A | 5/1977 | Moriya et al. |
| 4,032,482 A | 6/1977 | Moriya et al. |
| 4,093,567 A | 6/1978 | Hurwitz et al. |
| 4,100,149 A | 7/1978 | Meiller et al. |
| 4,186,086 A | 1/1980 | Ward |
| 4,189,539 A | 2/1980 | Ward |
| 4,191,814 A | 3/1980 | Amick |
| 4,245,005 A * | 1/1981 | Regnier et al. ............. 428/420 |
| 4,273,878 A | 6/1981 | Amick |
| 4,337,185 A | 6/1982 | Wessling et al. |
| 4,560,704 A | 12/1985 | Regnier et al. |
| 4,859,462 A | 8/1989 | Chow et al. |
| 5,523,327 A * | 6/1996 | Song et al. .................... 521/32 |
| 5,648,400 A | 7/1997 | Sugo et al. |

OTHER PUBLICATIONS

Tsuneda, S. et al., "Protein Adsorption Characteristics of Porous and Tentacle Anion–Exchange Membrane Prepared by Radiation–Induced Graft Polymerization", Radiat. Phys. Chem. vol. 46, No. 2, 1995, pp. 239–245.

Sasagawa, N. et al., "Ionic Crosslinking of $SO_3H$–Group–Containing Graft Chains Helps to Capture Lysozyme in a Permeation Mode"; Journal of Chromatography A, 848, pp. 161–168.

Ito, Y. et al., "Oxidoreduction–Sensitive Control of Water Permeation Through a Polymer Brushes–Grafted Porous Membrane", Macromolecules, vol. 30, No. 19, 1997, pp. 5856–5859.

* cited by examiner

Primary Examiner—Fred Teskin
(74) Attorney, Agent, or Firm—Sughrue Mion, PLLC

(57) ABSTRACT

An anion exchanger comprised of a fine particle having a cured polyethyleneimine surface layer formed on the fine particle surface. The cured polyethyleneimine surface layer is formed by the steps of: (1) dispersing a fine particle having a functional group capable of reacting with polyethyleneimine on the fine particle surface, in an aqueous solution of a crosslinking agent capable of crosslinking polyethyleneimine to prepare an aqueous dispersion of the fine particle; and then, (2) adding the polyethyleneimine and a catalyst for crosslinking the polyethyleneimine in the aqueous dispersion of the fine particle, and carrying a reaction of bonding the polyethyleneimine to the functional group on the fine particle surface and a reaction of crosslinking the polyethyleneimine with the crossslinking agent. The anion exchanger is used as a packing for chromatography.

10 Claims, 1 Drawing Sheet

ANION EXCHANGER, PROCESS FOR PRODUCING SAME, AND ITS USE

BACKGROUND OF THE INVENTION (1) Field of the Invention

This invention relates to an anion exchanger, a process for producing the anion exchanger, and a packing for chromatography comprised of the anion exchanger.

(2) Description of the Related Art

Fine particles having an ion exchanging group are widely used as a separating material in the field of pure water production and chromatography. An anion exchanger having introduced therein polyethyleneimine as an ion exchanging group is used in the field of chelate resins, liquid chromatography for analyzing or isolating, for example, amino acids, peptide, protein, nucleic acids and saccharides.

As examples of the method of making an anion exchanger comprised of a fine particle having introduced therein polyethyleneimine, there can be mentioned a method of introducing polyethyleneimine to a fine particle of a polymer having a halogenated alkyl group such as polychromethylstyrene as disclosed in U.S. Pat. No. 4,191,814; a method of introducing polyethyleneimine to an acrylate or methacrylate polymer having an epoxy group or a halogenated alkyl group as disclosed in U.S. Pat. No. 4,111,859; and a method of allowing an inorganic fine particle to adsorb polyethyleneimine and then crosslinking the adsorbed polyethyleneimine as disclosed in U.S. Pat. No. 4,245,005.

The present inventors found that, even when polyethyleneimine having a large molecular weight is introduced to a fine particle having a halogenated alkyl group or an epoxy group, the resulting ion exchanger exhibits an ion exchanging capacity enhanced only to a minor extent. It is presumed that this is because only a minor amount of polyethyleneimine is introduced. If a large amount of polyethyleneimine is added together with a large amount of a crosslinking agent to a liquid dispersion of fine particles to introduce a large amount of polyethyleneimine to the fine particle, the crosslinking of polyethyleneimine proceeds at a high rate and the reaction system undesirably becomes gelled. A similar problem arises in the above-mentioned method described in U.S. Pat. No. 4,245,005. That is, only a minor amount of polyethyleneimine can be adsorbed on fine particles, and, if a large amount of polyethyleneimine is adsorbed on fine particles and then a large amount of a crosslinking agent is added into a liquid dispersion of the polyethyleneimine-adsorbed fine particles, the liquid dispersion tends to be gelled at the crosslinking step. Therefore, the amounts of polyethyleneimine and a crosslinking agent used are restricted.

SUMMARY OF THE INVENTION

In view of the foregoing, an object of the present invention is to provide an anion exchanger which exhibits an enhanced anion exchanging capacity, and which can be advantageously made without tendency of gelling even by using relatively large amounts of polyethyleneimine and a crosslinking agent are used as compared with the conventional method using polyethyleneimine and a crosslinking agent.

Another object of the present invention is to provide a process for producing the above-mentioned anion exchanger exhibiting an enhanced anion exchanging capacity, which can be advantageously conducted without tendency of gelling even by using relatively large amounts of polyethyleneimine and a crosslinking agent are used.

Still another object of the present invention is to provide a packing for chromatography comprised of the above-mentioned anion exchanger exhibiting an enhanced anion exchanging capacity.

A further object of the present invention is to provide a column for chromatography packed with a packing comprised of the above-mentioned anion exchanger exhibiting an enhanced anion exchanging capacity.

In one aspect of the present invention, there is provided an anion exchanger which is a fine particle having a cured surface layer formed on the surface of the fine particle; characterized in that said cured surface layer is comprised of a crosslinked polyethyleneimine and is capable of being formed by the following steps (1) and (2):

(1) a first step of dispersing a fine particle having a functional group capable of reacting with polyethyleneimine on the surface of the fine particle, in an aqueous solution of a crosslinking agent capable of crosslinking polyethyleneimine to prepare an aqueous dispersion of the fine particle; and (2) a second step of adding the polyethyleneimine and a catalyst for crosslinking the polyethyleneimine in the aqueous dispersion of the fine particle, and carrying a reaction of bonding the polyethyleneimine to the functional group on the fine particle surface and a reaction of crosslinking the polyethyleneimine with the crossslinking agent.

In another aspect of the present invention, there is provided a process for producing an anion exchanger which is a fine particle having a cured surface layer comprised of crosslinked polyethyleneimine and formed on the surface of the fine particle, characterized by comprising the steps of:

(1) a first step of dispersing a fine particle having a functional group capable of reacting with polyethyleneimine on the surface of the fine particle, in an aqueous solution of a crosslinking agent capable of crosslinking polyethyleneimine to prepare an aqueous dispersion of the fine particle; and (2) a second step of adding the polyethyleneimine and a catalyst for crosslinking the polyethyleneimine in the aqueous dispersion of the fine particle, and carrying a reaction of bonding the polyethyleneimine to the functional group on the fine particle surface and a reaction of crosslinking the polyethyleneimine with the crossslinking agent.

The polyethyleneimine used preferably has a number average molecular weight of not larger than 10,000, more preferably not larger than 1,000, and has a functional group on the fine particle surface which is preferably at least one member selected from a glycidyl group, a halogenated alkyl group and an aldehyde group. The fine particle is preferably a porous particle having pores with an average diameter of at least 100 Å. The crosslinking agent is preferably epichlorohydrin or a polyfunctional epoxy compound such as ethylene glycol diglycidyl ether, polyethylene glycol diglycidyl ether, polypropylene glycol diglycidyl ether, 1,4-butanediol diglycidyl ether, glycerol polyglycidyl ether or sorbitol polyglycidyl ether. The catalyst used for crosslinking is preferably an alkali metal hydroxide.

In still another aspect of the present invention, there is provided a packing for chromatography, which is comprised of the above-mentioned anion extender.

In a further aspect of the present invention, there is provided a column for chromatography, which is packed with the above-mentioned packing.

PREFERRED EMBODIMENTS OF THE INVENTION

Figure 1:
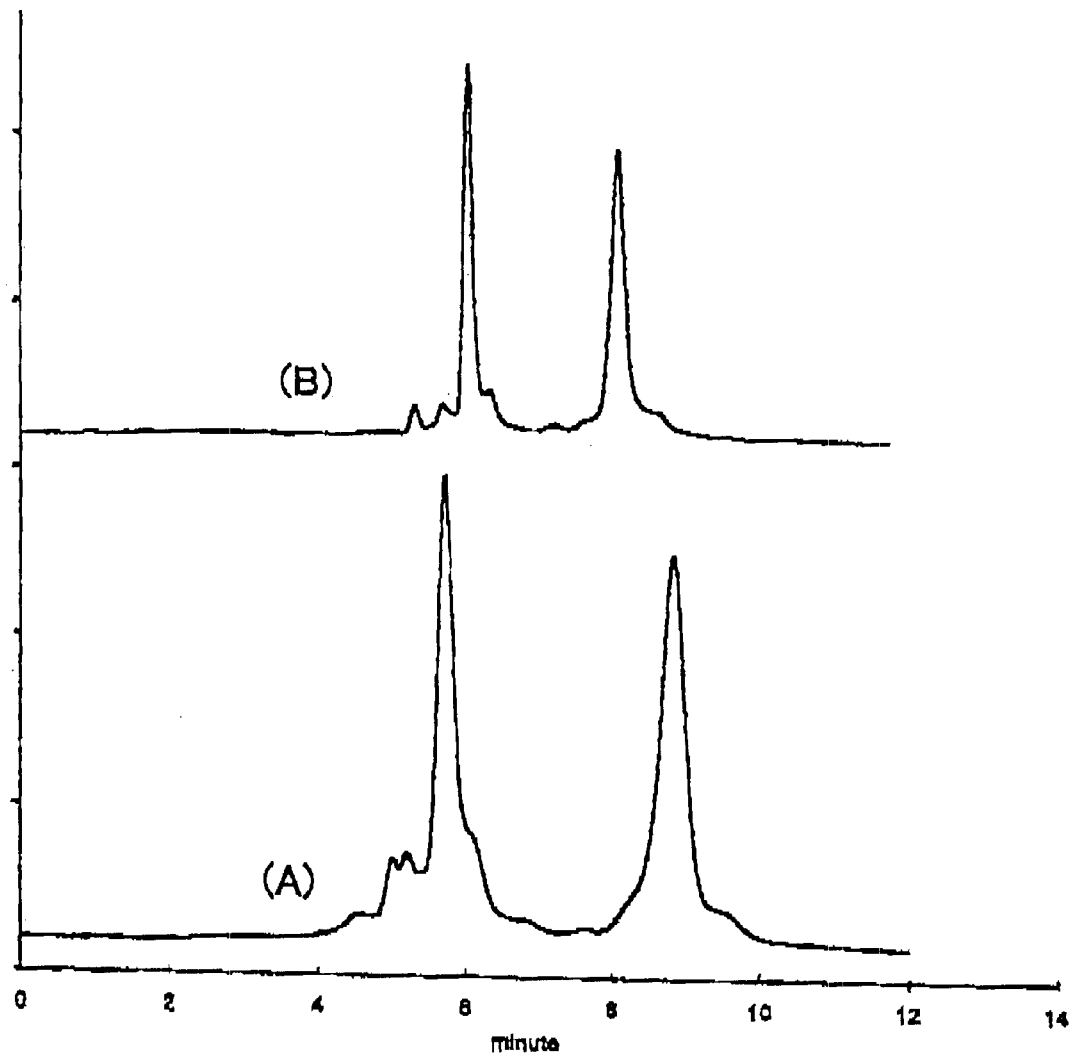
FIG. 1 illustrates chromatogram (A) as obtained for separating protein by using an anion exchanger of the present invention in Example 1 and chromatogram (B) as obtained for separating protein by using a comparative anion exchanger in Comparative Example 3.

The anion exchanger of the present invention is comprised of a fine particle having bound to the surface thereof a polyamine an anion exchanger which is a fine particle having a cured surface layer comprised of crosslinked polyethyleneimine and formed on the surface of the fine particle.

The fine particle may be either a non-porous fine particle having no pores on the surface thereof, but is preferably a porous particle having exposed pores on the surface thereof. When porous particles having exposed pores on the surface thereof are used, polyethyleneimine enters in the pores at a step of making the polyethyleneimine surface layer, and thus, the cured polyethyleneimine surface layer is partly formed in the pores in addition to the outer surface of fine particle. Consequently a large amount of polyethyleneimine can be bound onto the fine particle surface, and an anion exchanger having an improved ion exchanging capacity can be obtained. In view of the obtained ion exchanging capacity, the pores preferably have an average diameter of at least 100 Å, more preferably 250 Å. The upper limit of the pore size is not particularly limited but is usually about 0.5 $\mu$m.

The diameter of a fine particle constituting the anion exchanger of the present invention is not particularly limited, but is preferably in the range of about 1 $\mu$m to about 100 $\mu$m to obtain a better separation capability when used for liquid chromatography.

The fine particles used include organic fine particles and inorganic fine particles. The organic fine particles include, for example, those of copolymers of a monofunctional vinyl monomer with a polyfunctional vinyl monomer, and crosslinked polysaccharides. As specific examples of the monofunctional vinyl monomer, there can be mentioned hydroxyalkyl esters of acrylic acid and methacrylic acid, such as 2-hydroxyethyl acrylate, 2,3-dihydroxypropyl acrylate, 2-hydroxyethyl methacrylate and 2,3-dihydroxypropyl methacrylate; epoxy group-containing esters of acrylic acid and methacrylic acid, such as glycidyl acrylate and glycidyl methacrylate; halogenated alkyl esters of acrylic acid and methacrylic acid, such as 3-chloro-2-hydroxypropyl acrylate, 3-bromopropyl acrylate, 3-chloro-2-hydroxypropyl methacrylate and 3-bromopropyl methacrylate; acrylic acid and methacrylic acid; alkyl acrylates and alkyl methacrylates, such as methyl acrylate, ethyl acrylate, methyl methacrylate and ethyl methacrylate; styrene derivatives such as chloromethylstyrene, vinylbenzyl alacohol, vinylbenzyl glycidyl ether and hydroxystyrene; and vinyl acetate. As specific examples of the polyfunctional vinyl monomer, there can be mentioned polyol esters of acrylic acid and methacrylic acid, such as ethylene glycol diacrylate, glycerol diacrylate, ethylene glycol dimethacrylate and glycerol dimethacrylate; and divinylbenzene and triallyl isocyanurate. As specific examples of the crosslinked polysaccharides, there can be mentioned cellulose, agarose, dextran and mannose.

As specific examples of the inorganic fine particles, there can be mentioned silica, zeolite, titania, aluminum oxide and hydroxyapatite.

The fine particle used in the present invention has a functional group capable of reacting with polyethyleneimine on the surface of the fine particle, which group can be a site to which polyethyleneimine is bound. The functional group is not particularly limited, but is preferably selected from a glycidyl group, a halogenated alkyl group and an aldehyde group because the polyethyleneimine can be effectively introduced to an epoxy group, a halogenated alkyl group or an aldehyde group by placing a fine particle having these groups in contact with an aqueous dispersion of polyethyleneimine. The halogenated alkyl group is preferably a chlorinated, brominated or iodated alkyl group having 1 to 6 carbon atoms. The functional group on the fine particle surface may be either a single kind of group or a combination of two or three kinds of groups.

The fine particle having a functional group capable of reacting with polyethyleneimine, such as an epoxy group or a halogenated alkyl group or an aldehyde group, on the surface thereof is known and can be prepared by a conventional procedure.

An epoxy group, a halogenated alkyl group and an aldehyde group can be introduced onto the surface of fine particle by treating a fine particle with, for example, epichlorohydrin, ethylene glycol diglycidyl ether and butanediol diglycidyl ether for an epoxy group; epichlorohydrin and 1,3-bromobutane for a halogenated alkyl group; and glutaraldehyde for an aldehyde group.

The fine particle having a cured surface layer comprised of crosslinked polyethyleneimine and formed on the surface of the fine particle is produced by a process comprising the following two steps.

(1) In a first step, a fine particle having a functional group capable of reacting with polyethyleneimine on the surface of the fine particle is dispersed in an aqueous solution of a crosslinking agent capable of crosslinking polyethyleneimine to prepare an aqueous dispersion of the fine particle; and (2) in a second step, the polyethyleneimine and a catalyst for crosslinking the polyethyleneimine are added in the aqueous dispersion of the fine particle, and a reaction of bonding the polyethyleneimine to the functional group on the fine particle surface and a reaction of crosslinking the polyethyleneimine with the crossslinking agent are carried out.

The molecular weight of the polyethyleneimine used is not particularly limited, but the polyethyleneimine preferably has a number average molecular weight of not larger than 10,000, more preferably not larger than 1,000, as measured by the boiling-point method. Polyethyleneimine having the lowest molecular weight used in the present invention is usually a trimer of ethyleneimine. The amount of polyethyleneimine in the aqueous dispersion is preferably in the range of 0.3 to 0.5 part by weight based on one part by weight of the fine particle. By using the polyethyleneimine having the above-specified low molecular weight in a controlled amount, the undesirable gelling can avoided in the step of crosslinking the polyethyleneimine and the cured surface layer comprised of a crosslinked polyethyleneimine can be advantageously formed.

The crosslinking agent used for crosslinking the polyethyleneimine is not particularly limited, but usually a water-soluble crosslinking agent, preferably epichlorohydrin or a water-soluble polyfunctional epoxy compound is used. As specific examples of the water-soluble polyfunctional epoxy compounds, there can be mentioned ethylene glycol diglycidyl ether, polyethylene glycol diglycidyl ether, polypropylene glycol diglyoidyl ether. 1,4-butanediol diglycidyl ether, glycerol polyglycidyl ether or sorbitol polyglycidyl ether. These crosslinking agents may be used either alone or as a combination of at least two thereof. The amount of the crosslinking agent is not particularly limited, but is preferably in the range of 0.3 to 0.5 part by weight based on one part by weight of the fine particle.

The amount of water used as a liquid medium in which the fine particles are dispersed in not particularly limited but is preferably such that the ratio of water to the fine particles is in the range of 90/10 to 40/60 by weight, more preferably 70/30 to 45/55 by weight.

As the catalyst used for promoting the crosslinking reaction, an alkali metal hydroxide such as sodium hydroxide or potassium hydroxide is preferably used. The amount of the catalyst is preferably in the range of 0.1 to 0.2 part by weight based on one part by weight of the fine particle.

In the second step, polyethyleneimine and the catalyst are added preferably as an aqueous solution to the aqueous dispersion containing the fine particles and the crosslinking agent. The catalyst and polyethyleneimine may be added either as a single solution to which the catalyst and polyethyleneimine have been dissolved, or as separate aqueous solutions. Preferably the addition of the catalyst and polyethyleneimine is carried out not in a lot, but little by little over a period of 30 minutes to 2 hours while being gently stirred at room temperature to avoid occurrence of rapid crosslinking.

The reaction of bonding the polyethyleneimine to the functional group on the fine particle surface and the reaction of crosslinking the polyethyleneimine with the crossslinking agent proceed simultaneously. These reactions should preferably be carried out under mild conditions, that is, at a temperature in the range of room temperature to 50° C. for a time period of 10 minutes to 2 hours, to avoid gel formation during the crosslinking reaction.

Finally the fine particles having a cured surface layer comprised of a crosslinked polyethyleneimine is recovered from the aqueous reaction mixture and purified by washing an aqueous hydrochloric acid solution and/or water by the conventional procedure.

The anion exchanger of the present invention is useful as a packing for chromatography. More specifically the anion extender is packed in a column made of glass or a metal, and the packed column is used in chromatography for analyzing, separating or isolating anionic protein or other materials.

The invention will now be described by the following working examples that by no means limit the scope of the invention.

EXAMPLE 1

(Preparation of Anion Exchanger)

A 500 ml three-necked flask is charged with 50 g of porous hydrophilic acrylate polymer particles having an average particle diameter of 10 µm and pores with an average diameter of 1,000 Å, 50 g of pure water and 50 g of epichlorohydrin. A stirrer is equipped with the flask, and the flask was dipped in an oil bath maintained at 40° C. and the content was gently stirred. The above-mentioned porous hydrophilic acrylate polymer particles used were taken from a commercially available column (tradename "TSK gel G5000 PWXL" available from Tosoh Corporation).

Separately, a 200 ml flask was charged with 40 g of sodium hydroxide and 60 g of pure water to prepare an aqueous sodium hydroxide solution. The aqueous sodium hydroxide solution was dropwise added to the above-mentioned content in the 500 ml flask over a period of one hour by using Perista pump while being stirred. After completion of the dropwise addition of sodium hydroxide, the mixture was further stirred for one hour to conduct epoxidation of the acrylate polymer particle surface. After completion of epoxidation, the fine particles were separated by a glass filter and washed with pure water.

A 300 ml three-necked flask was charged with 50 g of the epoxidated fine particles, and then 20 g of ethylene glycol diglycidyl ether and 50 g of pure water was added. The flask was dipped in an oil bath maintained at 40° C., and the mixture was stirred to prepare a dispersion containing the epoxidated fine particles and a crosslinking agent.

Separately a 200 ml flask was charged with 50 ml of 4N aqueous sodium hydroxide solution and 20 g of polyethyleneimine having a number average molecular weight of 600 (available from Wako Pure Chemical Ind. Ltd.) to prepare a polyethyleneimine solution.

The polyethyleneimine solution was added to the above-mentioned dispersion of the epoxidated fine particles and the crosslinking agent, and the mixture was stirred for 2 hours whereby a cured coating film comprised of crosslinked polyethyleneimine was formed on the surface of the fine particles. After completion of the reaction, the thus-obtained anion exchanger was separated by a glass filter, and washed with 0.5N aqueous hydrochloric acid and then with pure water. The anion exchanger had an ion exchanging capacity of 0.12 meq/ml·gel.

(Evaluation of Anion Exchanger's Adsorptive Separation Performance for Protein)

The anion exchanger was packed in a column having a size of 4.6 mm I.D.×5 mm L. The adsorption capacity for protein was measured by a break-through method. The measuring conditions and equipment employed were as follows.

Pump: trade name "CCPM-II" available from Tosoh Corporation

Auto-sampler: trade name "AS-8020" available from Tosoh Corporation

Detector: trade name "UV-8020" available from Tosoh Corporation

Sample: 10 mg/ml, "BSA" available from Sigma Co.

Amount of sample injected: 5 ml

Measurement wavelength: UV 280 nm

Eluting solution: 20 mM tris-HCl buffer (pH: 8.0)

The adsorption capacity for protein (BSA) was 150 mgBSA/ml·gel as calculated taking the 10% height of extinction change due to protein elution as the break point.

The above-mentioned anion exchanger was packed in a column having a size of 5.0 mm I.D.×50 mm L. Separation of protein was conducted under the following conditions. The equipment used was the same as mentioned above.

Eluting solution: A: 20 mM tris-HCl buffer (pH: 8.0)
  B: eluting solution A+1.0M aqueous sodium chloride Gradient: linear gradient transferring from 100% eluting solution A to 100% eluting solution B over a period of 15 minutes Flow rate: 1.0 ml/min.

Sample: Ovalbumine (2 mg/ml)
  Trypsin inhibitor (2 mg/ml)

Amount of sample injected: 20 µl

Measurement wavelength: UV 280 nm

The test results are shown in chromatogram (A) in FIG. 1. The abscissa shows the time (in minutes) elapsing from the injection of a sample into a measuring apparatus. As seen from chromatogram (A), the anion exchanger prepared in Example 1 had a large adsorption capacity for protein and a high separation performance. The liquid feed pressure in the flow paths was 1.0 MPa, and thus, the anion exchanger had good liquid permeation characteristics. That is, a large adsorption capacity and high separation performance can be obtained at a low operation pressure.

EXAMPLE 2

An anion exchanger was prepared and its adsorption capacity for protein was evaluated by the same procedures as described in Example 1 wherein 1,4-butanediol diglycidyl ether was used as a crosslinking agent with all other conditions remaining the sane.

The anion exchanger had an ion exchanging capacity of 0.11 meq/ml·gel and an adsorption capacity for protein of 135 mgBSA/ml·gel.

COMPARATIVE EXAMPLE 1

An anion exchanger was prepared and its adsorption capacity for protein was evaluated by the same procedures as described in Example 1 wherein the crosslinking agent and the 4N aqueous sodium hydroxide solution were not used with all other conditions remaining the same. That is, the anion exchanger had polyethyleneimine introduced onto the surface of an epoxidated fine particle, but did not have a cured coating comprised of crosslinked polyethyleneimine.

The anion exchanger had an ion exchanging capacity of 0.04 meq/ml·gel and an adsorption capacity for protein of 42 mgBSA/ml·gel.

COMPARATIVE EXAMPLE 2

Preparation of an anion exchanger was tried by the same procedures as described in Example 1 wherein the 4N aqueous sodium hydroxide solution were not used with all other conditions remaining the same. The reaction mixture was hardened in the step of forming a cured coating of crosslinked polyethyleneimine, and thus, the fine particles could not be taken from the flask.

COMPARATIVE EXAMPLE 3

50 g of the epoxidated fine particles prepared in Example 1 were placed in a 300 ml three-necked flask, and 10 ml of a 28% aqueous triethylamine solution (available from Tokyo Kasei Shiyaku K. K.) and 50 g of pure water were added. Then the flask was dipped in an oil bath maintained at 40° C., and the content in the flask was stirred for 2 hours. The thus-treated fine particles were separated by a glass filter, and washed with 0.5N aqueous hydrochloric acid solution and then with pure water to prepare an anion exchanger.

The anion exchanger had an ion exchanging capacity of 0.03 meq/ml·gel. The adsorption capacity for protein of the anion exchanger was 35 mgBSA/ml·gel.

The anion exchanger was packed in a column and protein separation performance was tested by the same procedures as described in Example 1 wherein the gradient time was changed to 30 minutes with all other conditions remaining the same. The test results are shown in chromatogram (B) in FIG. 1. As seen from FIG. 1, the protein separation effect was poor as compared with that obtained in Example 1 (chromatogram (A)).

As seen from FIG. 1, the anion exchanger of the present invention has a large ion exchanging capacity and a large adsorption capacity for protein, but, disadvantages such as widening of each elution peak of protein and elevation of operation pressure are not caused.

Advantages of the anion exchanger of the present invention are summarized as follows. The anion exchanger having polyethyleneimine introduced onto the fine particle surface exhibits an enhanced ion exchanging capacity and an enhanced adsorption capacity for protein and other objective samples, although the anion exchanger is comprised of fine particles. Therefore, the anion exchanger is useful for chelate resins and packings for chromatography. Especially when the anion exchanger is used as a packing for liquid chromatography, it exhibits high adsorption capacity, high retention, and high resolution for separation with a low operation pressure. The anion exchanger is especially suitable for separation of an objective sample as well as trace analysis of a sample containing a large amount of coexisting ingredients.

The anion exchanger is comprised of a fine particle and thus exhibits good liquid permeability and high resolution, and further the operation can be conducted at a reduced operation pressure. Thus, when protein or other materials are analyzed by using a column packed with the anion exchanger of the present invention, a large amount of a sample can be treated in a lot without elevation of operation pressure.

What is claimed is:

1. An anion exchanger which is a fine particle having a cured surface layer formed on the surface of the fine particle; said cured surface layer being comprised of a crosslinked polyethyleneimine and formed by the following steps (1) and (2):

(1) a first step of dispersing a fine particle having a functional group capable of reacting with polyethyleneimine on the surface of the fine particle, in an aqueous solution of a crosslinking agent capable of crosslinking polyethyleneimine to prepare an aqueous dispersion of the fine particle; and (2) a second step of adding the polyethyleneimine and a catalyst for crosslinking the polyethyleneimine in the aqueous dispersion of the fine particle, and carrying a reaction of bonding the polyethyleneimine to the functional group on the fine particle surface and a reaction of crosslinking the polyethyleneimine with the crossslinking agent.

2. A process for producing an anion exchanger which is a fine particle having a cured surface layer comprised of crosslinked polyethyleneimine and formed on the surface of the fine particle, which comprises the steps of:

(1) a first step of dispersing a fine particle having a functional group capable of reacting with polyethyleneimine on the surface of the fine particle, in an aqueous solution of a crosslinking agent capable of crosslinking polyethyleneimine to prepare an aqueous dispersion of the fine particle; and (2) a second step of adding the polyethyleneimine and a catalyst for crosslinking the polyethyleneimine in the aqueous dispersion of the fine particle, and carrying a reaction of bonding the polyethyleneimine to the functional group on the fine particle surface and a reaction of crosslinking the polyethyleneimine with the crossslinking agent.

3. The production process according to claim 2, wherein the polyethyleneimine has a number average molecular weight of not larger than 10,000.

4. The production process according to claim 2, wherein the fine particle is a porous particle having pores having an average diameter of at least 100 Å.

5. The production process according to claim 2, wherein the functional group on the fine particle surface is at least one member selected from the group consisting of a glycidyl group, a halogenated alkyl group and an aldehyde group.

6. The production process according to claim 2, wherein the crosslinking agent capable of crosslinking polyethyleneimine is epichlorohydrin or a polyfunctional epoxy compound.

7. The production process according to claim 6, wherein the polyfunctional epoxy compound is at least one compound selected from the group consisting of ethylene glycol diglycidyl ether, polyethylene glycol diglycidyl ether, polypropylene glycol diglycidyl ether, 1,4-butanediol diglycidyl ether, glycerol polyglycidyl ether and sorbitol polyglycidyl ether.

8. The production process according to claim 2, wherein the catalyst is an alkali metal hydroxide.

9. A packing for chromatography, which is comprised of the anion exchanger as claimed in claim 1.

10. A column for chromatography, which is packed with the packing as claimed in claim 9.

* * * * *